(12) United States Patent
Mor

(10) Patent No.: US 12,321,259 B1
(45) Date of Patent: Jun. 3, 2025

(54) DATA SLICE DELETION IN STORAGE SYSTEMS

(71) Applicant: INTERNATIONAL BUSINESS MACHINES CORPORATION, Armonk, NY (US)

(72) Inventor: Daniel Mor, Orlando, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/591,953

(22) Filed: Feb. 29, 2024

(51) Int. Cl.
  *G06F 12/00* (2006.01)
  *G06F 12/02* (2006.01)

(52) U.S. Cl.
  CPC .................. *G06F 12/0223* (2013.01)

(58) Field of Classification Search
  CPC ................................................. G06F 12/0223
  See application file for complete search history.

(56) References Cited

U.S. PATENT DOCUMENTS

| | | | |
|---|---|---|---|
| 8,984,371 B2 | 3/2015 | Gladwin | |
| 9,509,514 B2 | 11/2016 | Resch | |
| 9,866,595 B2 | 1/2018 | Grube | |
| 10,511,665 B2 | 12/2019 | Dhuse | |
| 10,698,863 B2 | 6/2020 | Wang | |
| 11,455,100 B2 | 9/2022 | Baptist | |
| 2005/0235109 A1* | 10/2005 | Ogihara | G06F 12/12 |
| | | | 711/114 |
| 2011/0029753 A1* | 2/2011 | Baptist | G06F 11/1076 |
| | | | 711/170 |
| 2012/0054581 A1* | 3/2012 | Grube | G06F 3/0679 |
| | | | 714/769 |
| 2013/0138970 A1* | 5/2013 | Resch | G06F 3/0641 |
| | | | 713/189 |

(Continued)

FOREIGN PATENT DOCUMENTS

| | | | | |
|---|---|---|---|---|
| CN | 107610761 A | * | 1/2018 | |
| CN | 115454980 A | * | 12/2022 | |
| CN | 113127210 B | * | 3/2024 | G06F 12/1466 |

OTHER PUBLICATIONS

Bhattacharjee et al.; "Efficient Bulk Deletes for Multi Dimensional Clustered Tables in DB2", VLDB'07 33rd ACM International Conference, Sep. 23-28, 2007, pp. 1197-1206.

(Continued)

*Primary Examiner* — Tim T Vo
*Assistant Examiner* — Mohammad S Hasan
(74) *Attorney, Agent, or Firm* — Eric W. Chesley

(57) ABSTRACT

Described are techniques for performing no-seek deletes of data slices. The techniques include determining, in response to a request to delete a first data slice managed by a storage system, that a record for the first data slice exists in a catalog of the storage system. The techniques further include obtaining a pointer for the first data slice, the pointer referencing a storage location on a physical storage device. The techniques further include determining that the pointer exclusively references a single data slice stored at the storage location on the physical storage device. The techniques further include performing a no-seek delete of the first data slice in response to determining that the record for the first data slice exists in the catalog of the storage system and determining that the pointer references the single data slice.

20 Claims, 6 Drawing Sheets

(56) References Cited

U.S. PATENT DOCUMENTS

| | | | |
|---|---|---|---|
| 2014/0019579 A1* | 1/2014 | Motwani | G06F 3/0647 |
| | | | 709/216 |
| 2016/0147654 A1* | 5/2016 | Zhao | G06F 12/0864 |
| | | | 711/130 |
| 2017/0017671 A1 | 1/2017 | Baptist | |
| 2017/0192688 A1 | 7/2017 | Dhuse | |
| 2018/0074735 A1* | 3/2018 | Lee | G06F 16/122 |
| 2018/0107779 A1* | 4/2018 | Zepter | G06F 30/337 |
| 2018/0239701 A1* | 8/2018 | Baptist | G06F 11/1076 |
| 2019/0007380 A1* | 1/2019 | Volvovski | H04L 9/0894 |
| 2020/0192898 A1* | 6/2020 | Caldwell | G06F 16/2471 |
| 2022/0107861 A1 | 4/2022 | Khadiwala | |
| 2022/0121568 A1* | 4/2022 | Li | G06F 12/0246 |
| 2022/0146660 A1* | 5/2022 | Singh | G01S 13/426 |
| 2023/0064907 A1 | 3/2023 | Lin | |
| 2023/0080824 A1 | 3/2023 | Baptist | |
| 2023/0333931 A1 | 10/2023 | Gladwin | |

OTHER PUBLICATIONS

Minaei et al.; "Deceptive Deletions for Protecting Withdrawn Posts on Social Platforms", Cornell University Library, arXiv:2005.14113v1, May 28, 2020, pp. 1-17.

Sarkar et al.; "Enabling Timely and Persistent Deletion in LSM-Engines", ACM Transactions on Database Systems, Aug. 9, 2023, pp. 1-39, vol. 48, Issue 3, Article 8.

Srinivasan et al.; "iDedup: Latency-Aware, Inline Data Deduplication for Primary Storage", FAST'12 10th USENIX Conference, Feb. 14-17, 2012, pp. 1-14.

Zhang et al.; "yFS: A Journaling File System Design for Handling Large Data Sets With Reduced Seeking", FAST'03 2nd USENIX Conference, Mar. 31-Apr. 2, 2003, pp. 59-72.

* cited by examiner

DATA SLICE DELETION IN STORAGE SYSTEMS

BACKGROUND

The present disclosure relates to data management, and, more specifically, to data management in storage systems.

In storage systems, a data object is divided into data slices comprising small, self-contained portions of the data object which can be stored independently. Data slicing is a key component of certain storage systems, which leverage the data slicing for enhanced resilience, scalability, and performance. While not all storage systems use data slicing, it is becoming increasingly common as a strategy for optimizing data protection, scalability, and performance.

SUMMARY

Aspects of the present disclosure are directed toward a computer-implemented method comprising, determining, in response to a request to delete a first data slice managed by a storage system, that a record for the first data slice exists in a catalog of the storage system. The computer-implemented method further comprising, obtaining a pointer for the first data slice, the pointer referencing a location on a physical storage device as containing the first data slice. The computer-implemented method further comprising, determining that the pointer exclusively references a single data slice stored at the location on the physical storage device. The computer-implemented method further comprising, performing a no-seek delete of the first data slice in response to the determining that the record for the first data slice exists in the catalog of the storage system and the determining that the pointer exclusively references the single data slice stored at the location on the physical storage device.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
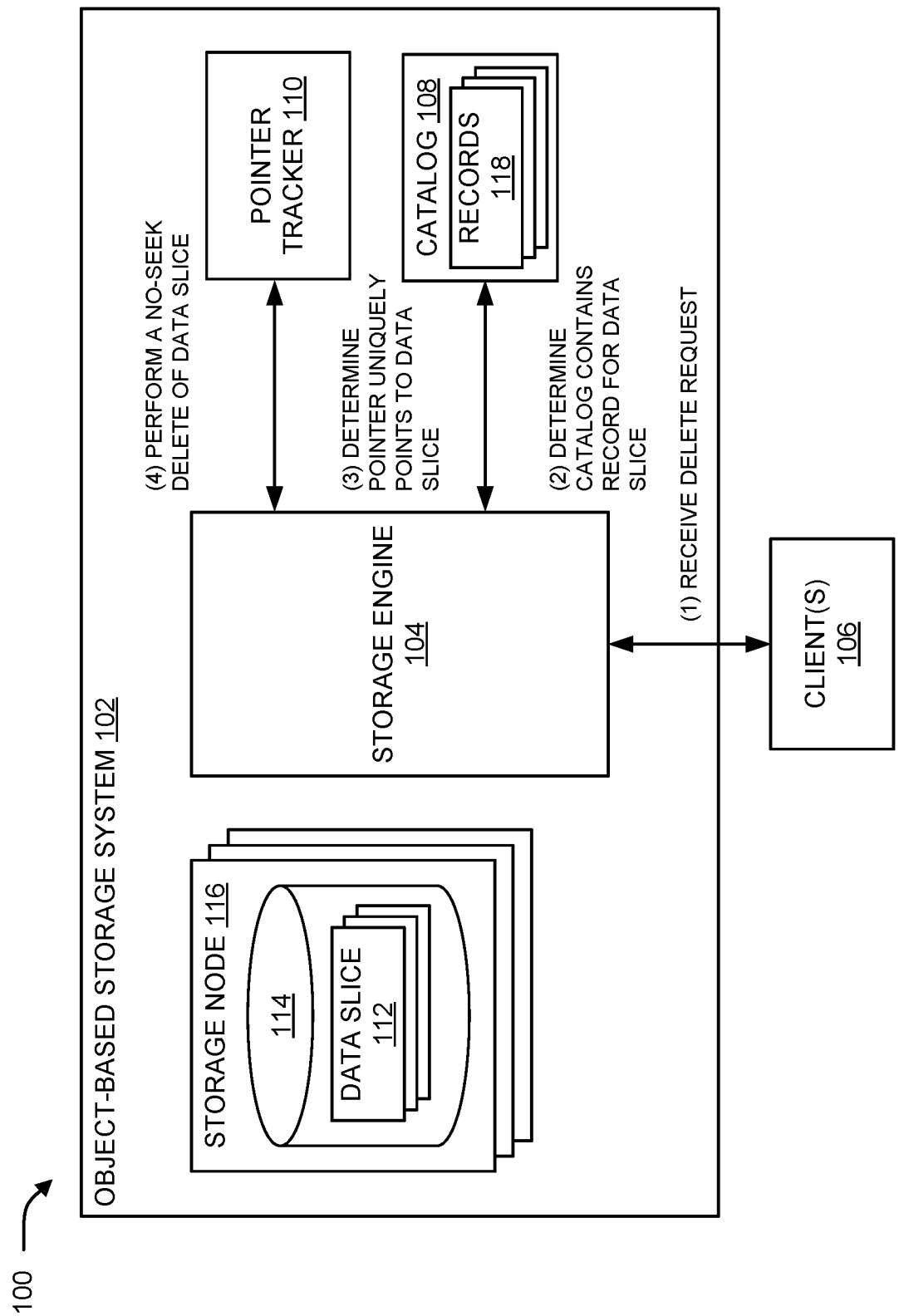
FIG. 1 is a block diagram illustrating an example computational environment implementing no-seek deletes of data slices, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward deleting data slices managed by a storage system, and, more specifically, toward performing no-seek deletes of data slices. While not limited to such applications, embodiments of the present disclosure may be better understood in light of the aforementioned context.

As described above, in storage systems, a data slice is a small, self-contained portion of an object's data that can be stored independently. As an example, data slicing in object-based storage works via operations that include, object division, distribution and replication, metadata tracking, and object retrieval. Illustratively, when an object is uploaded to an object-based storage system that employs data slicing, the object is divided into multiple data slices. Each slice holds a fragment of the object's data. The data slices are then distributed and replicated across multiple storage nodes managed by the object-based storage system. This decentralization helps to ensure data availability and resilience in the event of node failures. The object-based storage system maintains metadata that maps the object's identity to physical storage locations where the object's data slices are stored. When a user requests the object, the object-based storage system locates the data slices using the metadata and reassembles the data slices to reconstruct the object.

Prior to the present disclosure, deleting an object from storage involved performing a seek for each of the object's data slices in order to confirm that the data slices exist at specified storage locations on the physical storage. The seek typically includes reading metadata stored at a physical storage location referenced by a pointer to confirm that the data contained at the storage location is the data slice associated with the pointer. However, performing a seek for each of an object's data slices utilizes a greater amount of time and computing resources (e.g., processing and memory) that would otherwise not be utilized if the seeks were not performed.

Advantageously, aspects of the present disclosure improve storage systems that utilize data slicing by reducing the number of seeks performed when performing bulk deletes of multiple slices. More specifically, aspects of the present disclosure can perform a no-seek deletion of a data slice when a set of prerequisites or preconditions are met. In some embodiments, the set of prerequisites for performing a no-seek delete of a data slice can include: a determination that a catalog of a storage system includes a record for the data slice; a determination that a pointer exists for the data slice; and a determination that the pointer references a single data slice stored within the physical storage infrastructure of the storage system (e.g., not multiple revisions of a single data slice nor multiple unrelated data slices associated with a hash collision). When met, these conditions provide evidence that: the data slice exists (via the record in the catalog), the data slice is valid (via the pointer to the data slice), and the data slice is located at the storage location referenced by the pointer (via the pointer exclusively referencing the single data slice). This evidence can be sufficient to allow the data slice to be deleted without having to confirm that the storage location referenced by the pointer actually contains the data slice. Not having to perform a seek prior to deleting the data slice advantageously improves the performance of the storage system by reducing both the amount of time and computing resources used to delete the data slice.

The aspects of the present disclosure described above also improve other features of storage systems that implement data slicing. As an example, aspects of the present disclosure can be used to improve vault deletion, such that when a vault containing a collection of objects is marked for deletion, no-seek deletes can be performed to delete data slices associated with the collection of objects that are eligible for no-seek deletion, thereby reducing an amount of time and computing resources (e.g., disk utilization) used to delete the vault.

As another example, aspects of the present disclosure can be implemented to improve data slice migration from a first storage location to a second storage location, such that after a data slice has been copied to the second storage location, the data slice, if eligible, can be deleted from the first storage location using a no-seek delete, thereby reducing an amount of time and computing resources used to move the data slice from the first storage location to the second storage location. Accordingly, the aspects of the present disclosure are an improvement in the technical field of data management generally, and more particularly, in the technical field of data removal in the context of storage systems that utilize data slicing.

Referring now to the figures, FIG. 1 illustrates a block diagram of an example computational environment 100 for implementing no-seek deletes of data slices 112, in accordance with some embodiments of the present disclosure. As illustrated, the computational environment 100 includes an object-based storage system 102. Although an object-based storage system is illustrated in FIG. 1, it will be understood aspects of the present disclosure apply to any type of data storage system that implements data slicing. The object-based storage system 102 manages data as self-contained objects, where an object comprises data, metadata, and a unique identifier. The object-based storage system 102 can employ a data slicing technique that divides an object into a plurality of small, self-contained portions of the object's data, which are stored independently. For example, when an object is uploaded to the object-based storage system 102, the object can be divided into multiple data slices 112, and the data slices 112 can be distributed and replicated across multiple storage nodes 116. The storage nodes 116 can comprise physical storage devices 114 used to store data slices 112. A distributed architecture of the object-based storage system 102 can be used to distribute the data slices 112 across multiple storage nodes 116 for redundancy and scalability.

The object-based storage system 102 includes a storage engine 104. The storage engine 104 is responsible for managing the physical storage and retrieval of data. Among other things, the storage engine 104 handles the low level details of how objects and associated data slices 112 are stored, accessed, and deleted (which includes performing no-seek deletes, as will be described in detail below). As part of performing these functions, the storage engine 104 interfaces with a catalog 108 of the object-based storage system 102.

The catalog 108 comprises a collection of information associated with stored objects and corresponding data slices 112 managed by the object-based storage system 102. The collection of information can be organized into records 118 containing metadata for data slices 112. In some embodiments, the catalog 108 can comprise slice name metadata in a sorted order. A slice name for a data slice 112 listed in the catalog 108 can be used to obtain a pointer for the data slice 112. In some embodiments, the catalog 108 can include metadata for a data slice 112 comprising: a unique data slice identifier, a size and amount of storage space the data slice 112 occupies on a storage device 114, a pointer that points to a storage location of the data slice 112 on the storage device 114, and other information as can be appreciated. A pointer for a data slice 112 can comprise a location marker that tracks one or more storage locations (e.g., logical block addresses (LBA)) within the physical storage infrastructure of the object-based storage system 102 that contain the data slice 112. For example, storage can be divided into "zones" where each zone comprises of a number of megabytes. A pointer can include a zone number and an offset within the zone which, at lower layers, describes an LBA on a physical drive and how many bytes approximately a data slice occupies on the physical drive.

A pointer tracker 110 can be used to indicate whether the pointer for the data slice 112 exclusively references a single data slice or multiple data slices. For example, a storage location, in some cases, can include multiple data slices (e.g., due to overwrites or hash collisions). The pointer tracker 110 indicates whether the pointer points to a single data slice stored at a storage location, or points to multiple data slices stored at a storage location.

In some embodiments, the pointer tracker 110 can be implemented using a tracking data structure. Each field of the tracking data structure can correlate to a pointer for a data slice 112 and can contain a value (e.g., a binary value) indicating one of: the pointer references a single data slice stored at a storage location (e.g., a single block or range of blocks of storage within the physical storage infrastructure of the object-based storage system 102); or the pointer references more than one data slice stored at a storage location or stored at multiple storage locations within the physical storage infrastructure of the object-based storage system 102. Illustratively, when a data slice 112 is stored or modified, the storage engine 104 can update the tracking data structure to indicate whether or not a pointer for the data slice 112 exclusively references a single data slice. As will be appreciated, other types of techniques amenable to implementing the pointer tracker 110 are within the scope of the present disclosure.

As mentioned earlier, among other things, the storage engine 104 performs no-seek deletes of data slices 112. A no-seek delete is a technique for determining that a data slice 112 can be deleted without first accessing a storage location on a storage device 114 to confirm that the data slice 112 actually exists at the storage location. The technique includes a set of prerequisites for allowing the deletion of the data slice 112. The set of prerequisites can include: a determination that a catalog 108 of the object-based storage system 102 includes a record 118 for a data slice 112; a determination that a pointer exists for the data slice 112; and a determination that the pointer exclusively references a single data slice 112 stored at the storage location within the physical storage infrastructure of the object-based storage system 102. When the set of prerequisites are satisfied, there is sufficient evidence that the data slice 112 is valid and exists at the storage location referenced by the pointer, which allows the data slice 112 to be deleted without accessing the storage location to confirm that the storage location contains the data slice 112. This technique provides benefits for bulk deletion of data slices 112 by amortizing a few seeks to delete, for example, tens of thousands of data slices 112, as opposed to preforming a seek for every data slice 112 to be deleted.

FIG. 1 illustrates an example of operations performed by the storage engine 104 to determine whether a data slice 112 is eligible for no-seek deletion. As shown, the storage engine 104 receives delete requests from clients 106. Clients 106 of the object based storage system 102 can include applications and/or users interacting with the object based storage system 102 via application programming interfaces (APIs) or web interfaces. The delete requests can be associated with any type of operation that involves deleting data slices 112, including, but not limited to, deleting objects and vaults (where a vault is a collection of data stored in one logical container), rebalancing and reallocation of stored data managed by the object-based storage system 102, purging of unowned storage space managed by the object-based storage system 102, rebuilding storage managed by the object-based storage system 102, etc.

In response to receiving a request from a client 106 that involves deleting a data slice 112, the storage engine 104 determines whether the data slice 112 is eligible for no-seek deletion. The storage engine 104 makes the determination based on the set of prerequisites described above. Specifically, the storage engine 104 queries the catalog 108 for a record 118 associated with the data slice 112. The existence of a record 118 for the data slice 112 in the catalog 108 provides evidence that the data slice 112 exists on the object-based storage system 102.

If a record 118 for the data slice 112 is identified in the catalog 108, the storage engine 104 obtains a pointer for the data slice 112. In some embodiments, the pointer can be obtained from the record 118 for the data slice 112. As described earlier, a record 118 for a data slice 112 can be used to obtain a pointer that points to a storage location on a storage device 114 containing the data slice 112. Accordingly, after identifying the record 118 for the data slice 112, the storage engine 104 can obtain a pointer to the data slice 112 using the record 118 (e.g., using metadata in the record to obtain the pointer from a pointer data structure). In other embodiments, a pointer for a data slice 112 can be obtained from another source (e.g., a metadata index or the like), as will be appreciated. The existence of a pointer for the data slice 112 provides evidence that the data slice 112 is valid. That is, the pointer is evidence that a data slice identifier provided to the storage engine 104 is valid, thereby indicating that the data slice 112 exists at the storage location referenced by the pointer.

If a pointer for the data slice 112 is identified, the storage engine 104 then determines whether the pointer exclusively references a single data slice stored at a storage location on the storage device 114 (e.g., the pointer does not point to multiple revisions of a single data slice nor to multiple unrelated data slices associated with a hash collision). The storage engine 104 makes this determination by querying the pointer tracker 110. As described previously, the pointer tracker 110 is used to track whether a pointer for a data slice 112 references a single data slice 112 stored at a storage location, or references multiple data slices 112. If the pointer tracker 110 indicates that the pointer exclusively references a single data slice 112, this is evidence that data located at the storage location referenced by the pointer is the actual data slice 112.

In the case that the storage engine 104 determines that the set of prerequisites above are satisfied, the storage engine 104 can perform a no-seek delete of the data slice 112 without having to actually access the storage location on the storage device 114 containing the data slice 112. The storage engine 104 performs the no-seek delete by: obtaining the location, size, and/or amount of storage space that the data slice 112 occupies on the storage device 114 (e.g., from the record 118 for the data slice 112 included in the catalog 108); updating storage accounting to indicate that the storage space on the storage device 114 containing the data slice 112 is free (e.g., available for storing other data); and deleting the record 118 for the data slice 112 from the catalog 108. Marking the storage space occupied by the data slice 112 as available for storing other data and deleting the data slice's record 118 from the catalog effectively deletes the data slice 112 from the object-based storage system 102.

In the case that the storage engine 104 determines that the set of prerequisites are not satisfied, the data slice 112 is not eligible for no-seek deletion. In response, the storage engine 104 performs a delete operation that includes accessing one or more storage locations on the storage device 114 to confirm the existence of the data slice 112 on the object-based storage system 102. As will be appreciated, the operations described above can be performed by the storage engine 104 in association with any type of operation that involves deleting data slices 112, including deleting objects and vaults, rebalancing and reallocation of stored data managed by the object-based storage system 102, purging of unowned storage space managed by the object-based storage system 102, rebuilding storage managed by the object-based storage system 102, and other types of operations as will be appreciated.

Figure 6:
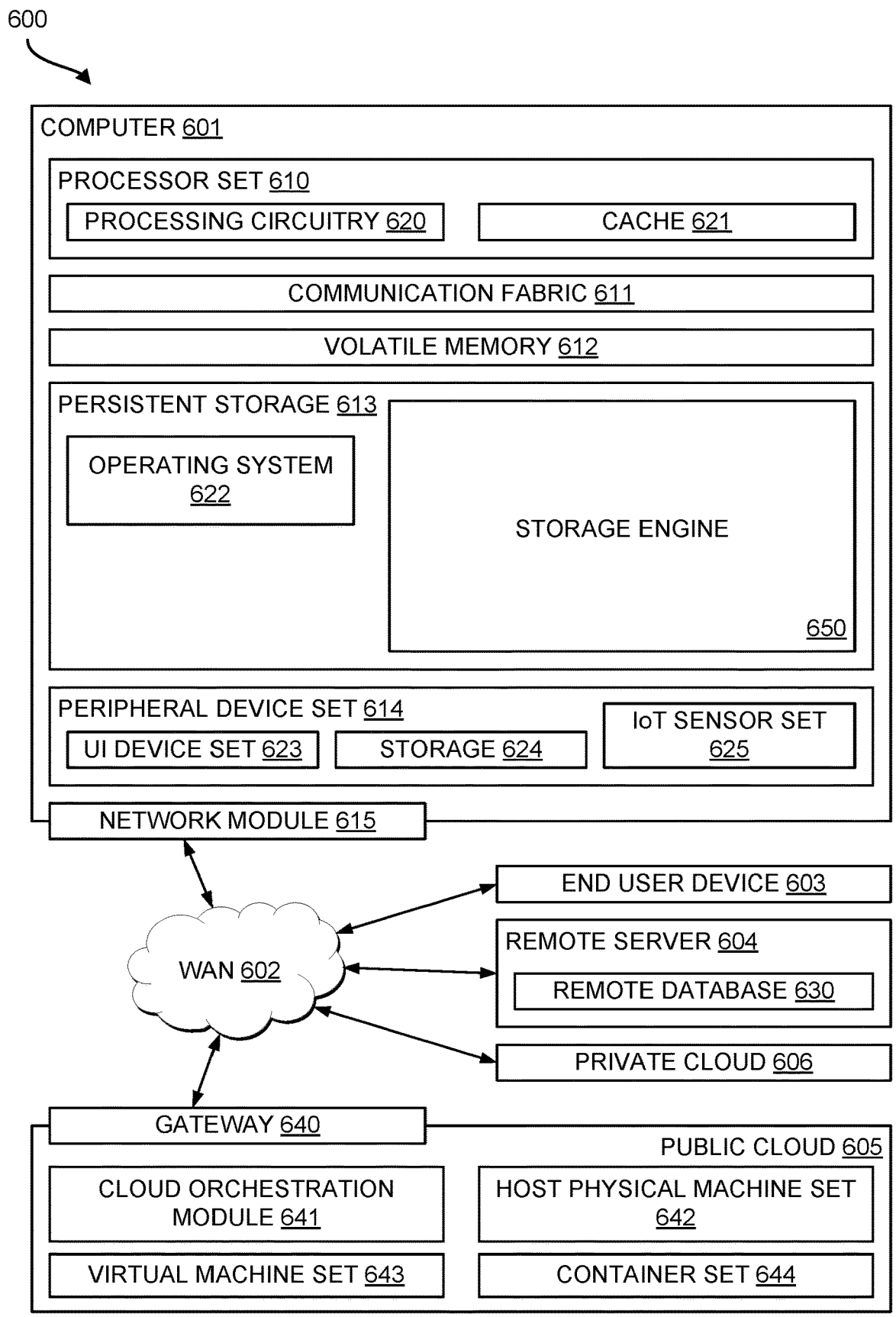
FIG. 6 is a block diagram that illustrates an example computing environment in which aspects of the present disclosure can be implemented, in accordance with some embodiments of the present disclosure.

All or a portion of the computational environment 100 shown in FIG. 1 can be implemented, for example by all or a subset of the computing environment 600 of FIG. 6. The storage engine 104 can be implemented in software, hardware, firmware or a combination thereof. When software is used, the operations performed by the storage engine 104 can be implemented in program instructions configured to run on hardware, such as a processor. When firmware is used, the operations performed by the storage engine 104 can be implemented in program instructions and data and stored in persistent memory to run on a processor. When hardware is employed, the hardware can include circuits that operate to perform the operations of the storage engine 104.

In some embodiments, the storage engine 104 can be considered a module. Generally, a module (also referred to as a program module) includes routines, programs, components and/or data structures that perform particular tasks and/or implement particular abstract data types. In some embodiments, the module can be implemented as computing services hosted in a computing service environment. For example, a module can be considered a service with one or more processes executing on a server or other computer hardware. Such services can provide a service application that receives requests and provides output to other services or consumer devices. An API can be provided for a module to enable the module to send requests to and receive output from other modules, services, clients, etc. Such APIs can allow third parties to interface with the module and make requests and receive output from the module.

The terms "storage", "storage device", and/or "storage system" can refer to any device or combination of devices capable of storing, accessing, organizing and/or retrieving data, which may include any combination and number of data servers and data storage configuration in any centralized, distributed, or clustered environment. Storage can include systems such as a SAN (Storage Area Network), cloud storage network, volatile or non-volatile RAM, optical media, hard-drive type media, and the like. A storage system may be representative of a plurality of storage devices as can be appreciated.

While FIG. 1 illustrates an example of a computational environment that can implement the techniques above, many other similar or different environments are possible. The example environment discussed and illustrated above is merely representative and not meant to be limiting.

Figure 2:
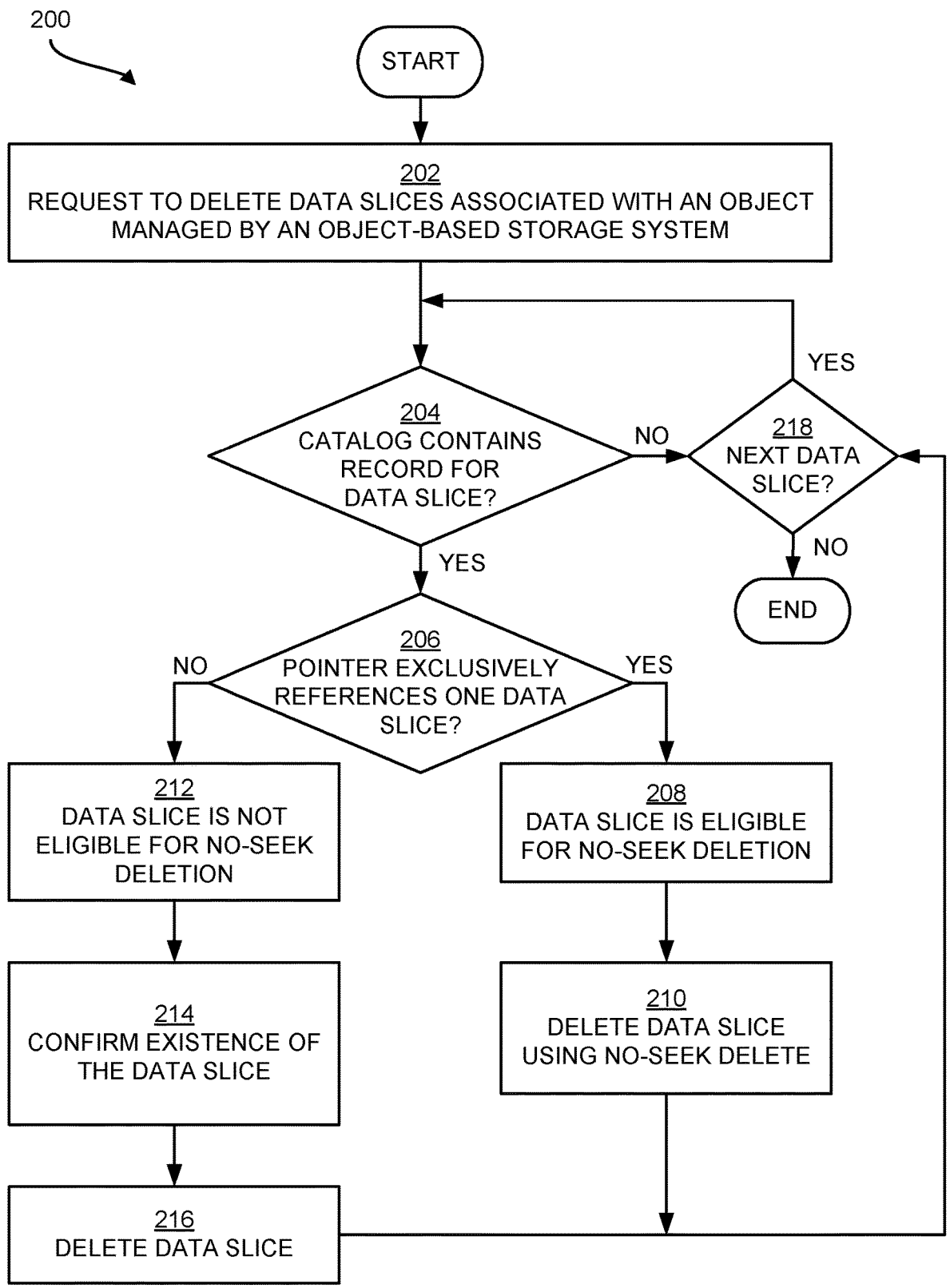
FIG. 2 is a flow diagram illustrating an example method for deleting data slices associated with an object, in accordance with some embodiments of the present disclosure.

FIG. 2 is a flow diagram illustrating an example method 200 for deleting data slices associated with an object, in accordance with some embodiments of the present disclosure. Object-based storage systems can use a distributed architecture with multiple servers. When an object is stored to an object-based storage system, the object can be split into smaller data slices, and a fan-out method can be used to determine how to distribute the data slices across the available storage nodes. When performing an operation associated with the object that involves deleting one or more of the data slices distributed using a fan-out method, the no-seek delete technique described herein can be used to delete those data slices determined to be eligible for no-seek deletion.

More specifically, in operation 202, the method 200 receives a request to delete data slices of an object managed by an object-based storage system. In response, the method 200 identifies a data slice associated with the object and determines whether the data slice is eligible for no-seek deletion. Specifically, in operation 204, the method 200 determines whether a catalog of the object-based storage system includes a record for the data slice. As described previously, the existence of a record for the data slice in the catalog provides evidence that the data slice exists on the object-based storage system. In the case that the catalog does not contain a record for the data slice (204: NO), the method 200 determines that the data slice does not exist and is therefore not eligible for no-seek deletion. Having determined that the data slice is not eligible for no-seek deletion, the method 200, in operation 218, then determines whether or not a next data slice of the object needs to be evaluated.

Returning to operation 204, in the case that the catalog does contain a record for the data slice (204: YES), the method 200 then proceeds to operation 206. In operation 206, the method 200 determines whether a pointer for the data slice exclusively points to a single data slice in storage. In some embodiments, the method 200 can determine whether the pointer exclusively references a single data slice by querying the tracking data structure described in association with FIG. 1.

In the case that the pointer does not reference a single data slice, then in operation 212, the method 200 determines that the data slice is not eligible for no-seek deletion. Accordingly, in operation 214, the method 200 confirms the existence of the data slice by accessing the storage locations referenced by the pointer to confirm that the data slice exists in storage, and in operation 216, the method deletes the data slice from the storage.

Returning to operation 206, in the case that the pointer does exclusively reference a single data slice, then in operation 208, the method 200 determines that the data slice is eligible for no-seek deletion. In response, the method 200, in operation 210 deletes the data slice without first performing a data seek that accesses the storage location referenced by the pointer to confirm that the storage location actually contains the data slice. More specifically, the method 200 obtains the location, size, and/or amount of storage space that the data slice occupies on a storage device and updates storage accounting to indicate that the storage space on the storage device containing the data slice is available for storing other data. Thereafter, the method 200 deletes the record for the data slice from the catalog of the object-based storage system. The method 200, in operation 218, then determines whether there are more data slices of the object to be deleted.

Figure 3:
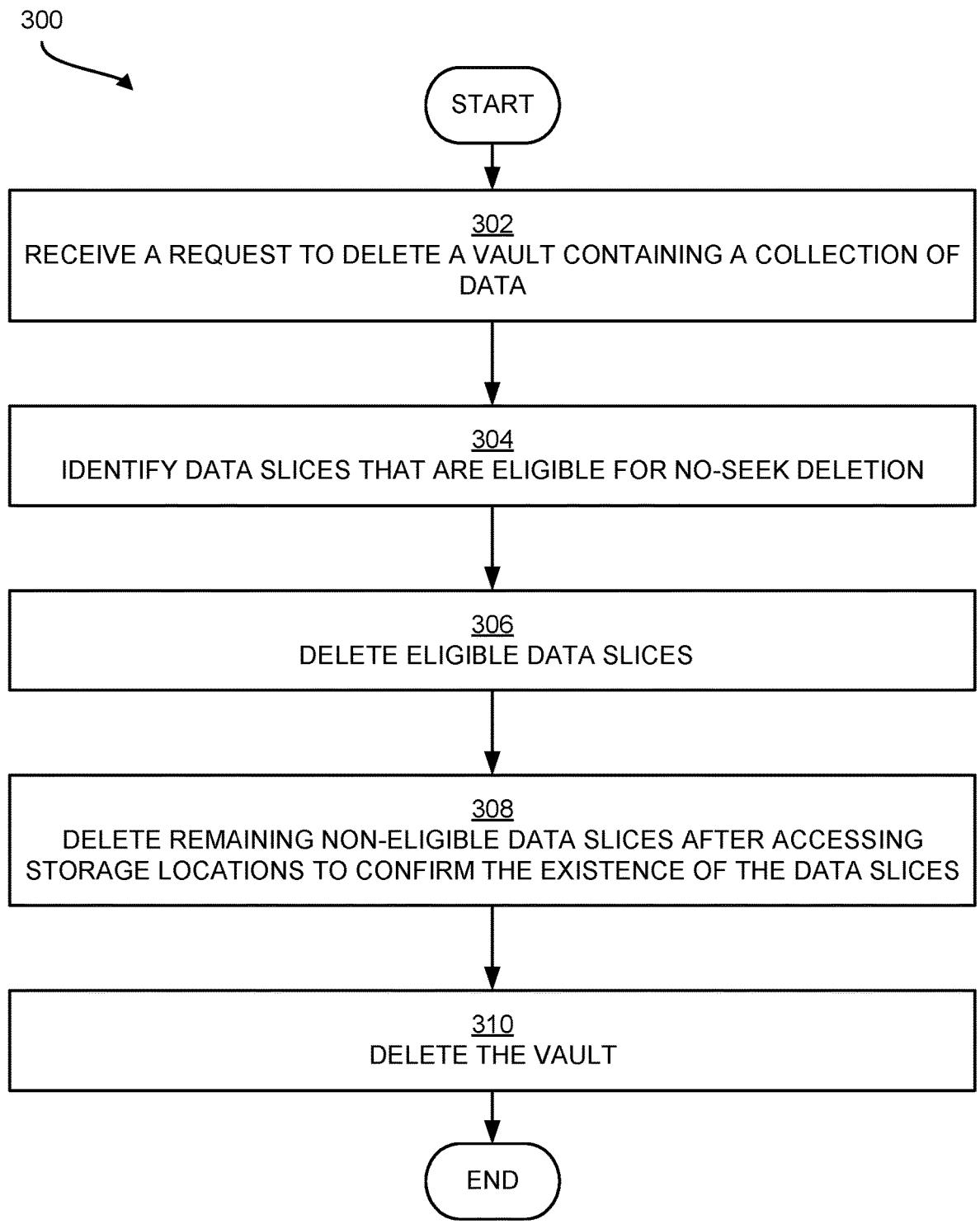
FIG. 3 is a flow diagram illustrating an example method for deleting a vault containing a collection of objects, in accordance with some embodiments of the present disclosure.

FIG. 3 is a flow diagram illustrating an example method 300 for deleting a vault containing a collection of objects, in accordance with some embodiments of the present disclosure. A vault (also referred to as a bucket) in the context of object-based storage systems comprises a collection of data stored in a logical container. The method 300 can be used to improve vault management within object-based storage systems.

In operation 302, the method 300 receives a request to delete a vault containing a collection of data managed by an object-based storage system. The data contained in the vault can include objects which have been divided into data slices and distributed and replicated across multiple storage nodes managed by the object-based storage system.

In operation 304, the method 300 identifies data slices that are eligible for no-seek deletion. In making the determination, the method 300 uses the set of prerequisites described earlier to identify data slices that are eligible for no-seek deletion. As an example, for each object contained in the vault, the data slices associated with an object can be identified and evaluated to determine whether the data slices are eligible for no-seek deletion.

In operation 306, the method 300 deletes data slices that are eligible for no-seek deletion without first performing a data seek that accesses the storage locations of the data slices to confirm that the storage locations actually contain the data slices. More specifically, for each eligible data slice, the method 300 obtains the location, size, and/or amount of storage space that the data slice occupies on a storage device and updates storage accounting to indicate that the storage space on the storage device containing the data slice is available for storing other data. Thereafter, the method 300 deletes the record for the data slice from a catalog of the object-based storage system.

In operation 308, the method 300 deletes the remaining non-eligible data slices after accessing the storage locations of the data slices to confirm the existence of the data slices. Also, any other data (e.g., metadata) contained in the vault can also deleted. Thereafter, in operation 310, the method 300 deletes the vault. As an example, the object-based system deletes a record for the vault from the object-based system's metadata store, which effectively deletes the vault.

Figure 4:
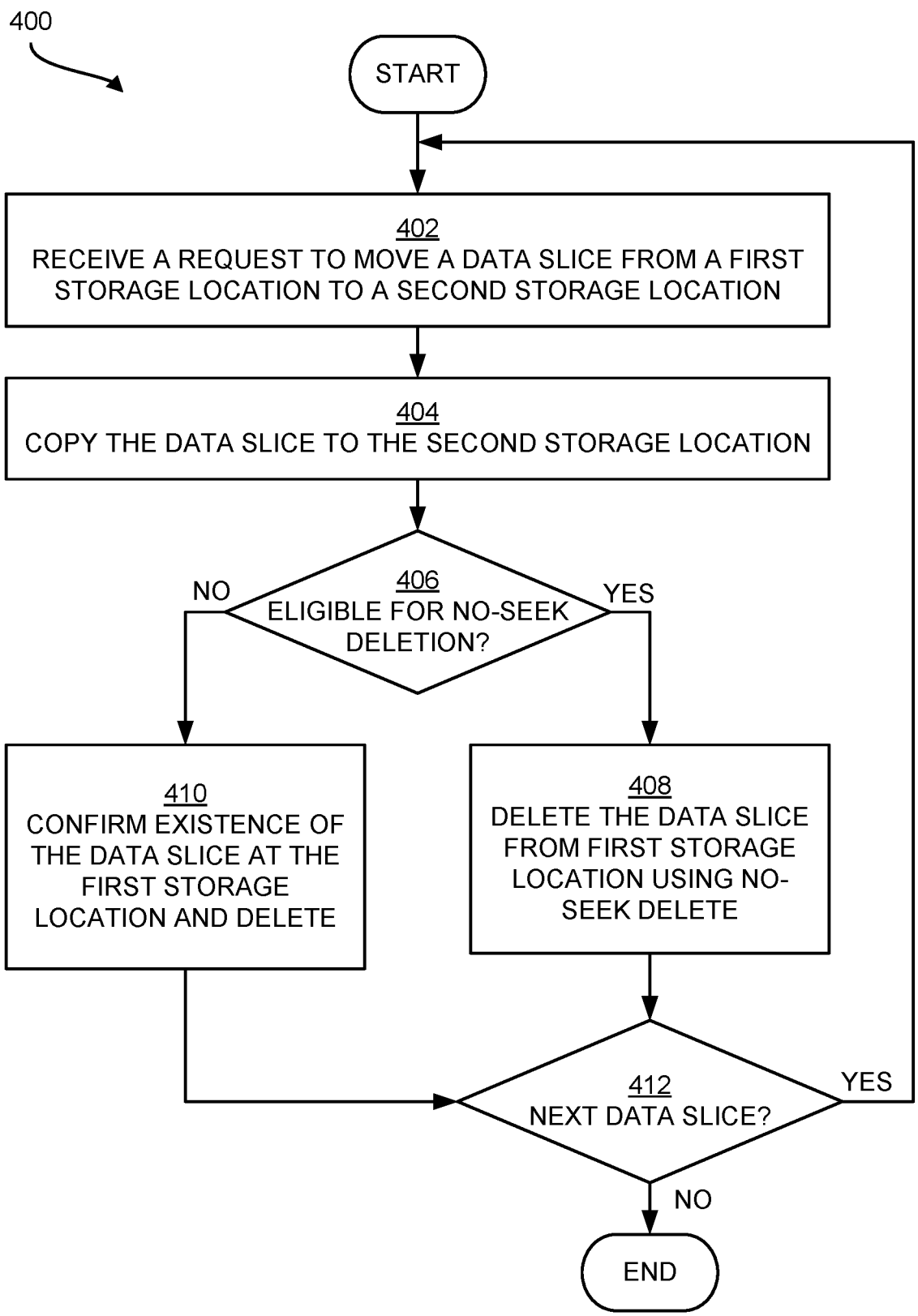
FIG. 4 is a flow diagram that illustrates an example method for moving a data slice from a first storage location to a second storage location, in accordance with some embodiments of the present disclosure.

FIG. 4 is a flow diagram that illustrates an example method 400 for moving a data slice from a first storage location to a second storage location, in accordance with some embodiments of the present disclosure. The method 400 can be used in association with operations that move data slices between storage locations, including, but not limited to, data rebalancing and data reallocation operations.

In operation 402, the method 400 receives a request to move a data slice from a first storage location to a second storage location. The storage locations specified in the request can be managed by an object-storage system. In some embodiments, the request can be associated with a data rebalancing or reallocation operation that moves (migrates)

a plurality of data slices from respective first storage locations to second storage locations.

In response to the request, the method 400 performs identification and preparation operations for copying the data slice to the second storage location. Thereafter, in operation 404, the method copies the data slice from the first storage location to the second storage location.

After copying the data slice to the second storage location, the method 400 in operation 406 determines whether the data slice is eligible for no-seek deletion. The method 400 uses the set of prerequisites described earlier to determine whether or not the data slice is eligible for no-seek deletion. In the case that the data slice is eligible, the method 400 in operation 408 deletes the data slice from the first storage location using a no-seek delete. More specifically, the method 400 obtains the location, size, and/or amount of storage space that the data slice occupies at the first storage location and updates storage accounting to indicate that the storage space at the first storage location is available for storing other data.

Returning to operation 406, in the case that the data slice is not eligible for no-seek deletion, the method 400 in operation 410 performs a data seek that accesses the first storage location (as well as other storage locations referenced by the pointer) to confirm that the first storage location (and other storage locations) actually contains the data slice. After confirming the existence of the data slice via the storage access, the method deletes the data slice. As shown 412, in embodiments where multiple data slices are moved from one storage location to another storage location (e.g., data rebalancing or data reallocation operations), the method 400 can be repeated for each data slice.

Figure 5:
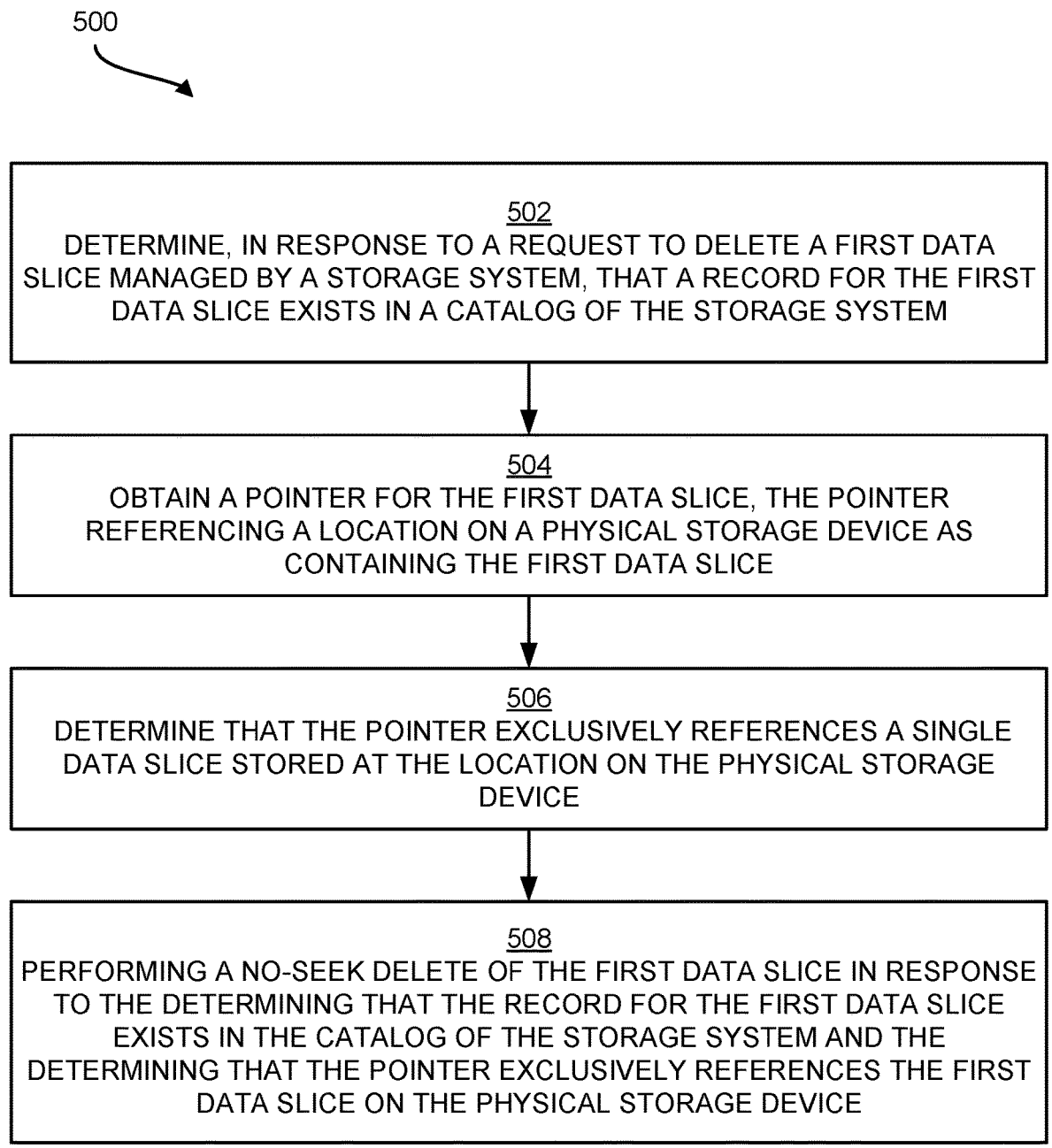
FIG. 5 is a flow diagram illustrating an example method for performing a no-seek delete, in accordance with some embodiments of the present disclosure.

FIG. 5 is a flow diagram illustrating an example method 500 for performing a no-seek delete, in accordance with some embodiments of the present disclosure. In operation 502, the method 500 determines, in response to a request to delete a first data slice managed by a storage system, that a record for the first data slice exists in a catalog of the storage system.

In operation 504, the method 500 obtains a pointer for the first data slice, the pointer referencing a location on a physical storage device as containing the first data slice. In some embodiments, obtaining the pointer comprises obtaining the pointer from the record for the first data slice included in the catalog of the storage system.

In operation 506, the method 500 determines that the pointer exclusively references a single data slice stored at the storage location on the physical storage device. In some embodiments, determining that the pointer exclusively references the first data slice on the physical storage device further includes querying a tracking data structure, which is maintained to track whether the pointer references more than one data slice.

In operation 508, the method 500 performs a no-seek delete of the first data slice in response to the determining that the record for the first data slice exists in the catalog of the storage system and the determining that the pointer exclusively references the first data slice. In some embodiments, performing the no-seek delete includes updating storage accounting to indicate that the storage on the physical storage device containing the first data slice is free, and thereafter, deleting the record for the first data slice from the catalog of the storage system.

In some embodiments, the request to delete the first data slice managed by the storage system is a request to delete an object. Deleting the object comprises deleting a plurality of data slices managed by an object-based storage system. In addition to determining that the first data slice is eligible for a no-seek delete, the method 500 can determine for a second data slice that a pointer (second pointer) for the second data slice references more than one storage location. As a result, the method 500 can access storage locations referenced by the second pointer to confirm that the second data slice exists at the storage locations, and thereafter, the method 500 can delete the second data slice.

In some embodiments, the request to delete the first data slice managed by the storage system is a request to delete a vault containing a collection of objects. In response to the request, the method 500 can perform no-seek deletes of eligible data slices associated with the collection of objects and delete remaining data slices that are not eligible for the no-seek deletes after accessing respective storage locations to confirm that the remaining data slices exist at the storage locations. Thereafter, the method 500 can delete the vault.

In some embodiments, the request to delete the first data slice managed by the storage system is a request to move (migrate) the first data slice from a first storage location to a second storage location. In response to the request, the method 500 can copy the first data slice to the second storage and, thereafter, perform the no-seek delete of the first data slice at the first storage location.

The methods described above in association with FIG. 2, FIG. 3, FIG. 4, and FIG. 5 can be performed by a computer (e.g., computer 601 in FIG. 6), performed in a cloud environment (e.g., clouds 606 or 605 in FIG. 6), and/or generally can be implemented in fixed-functionality hardware, configurable logic, logic instructions, etc., or any combination thereof. In some alternative implementations of an illustrative embodiment, the function or functions noted in the blocks may occur out of the order noted in FIG. 2, FIG. 3, FIG. 4, and FIG. 5. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the disclosed methods, such as computer code for a storage engine that performs no-seek deletes in block 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The computer readable program instructions, and associated data, are accessed by processor set 610 to control and direct performance of the disclosed methods. In computing environment 600, at least some of the instructions for performing the disclosed methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the disclosed methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the disclosed methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. As used herein, when used with reference to items, "a set of" means one or more of the items. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A computer-implemented method comprising:
   determining, in response to a request to delete a first data slice managed by a storage system, that a record for the first data slice exists in a catalog of the object-based storage system;
   obtaining a pointer for the first data slice, the pointer referencing a location on a physical storage device as containing the first data slice;
   determining that the pointer exclusively references a single data slice stored at the location on the physical storage device; and
   performing a no-seek delete of the first data slice in response to the determining that the record for the first data slice exists in the catalog of the storage system and the determining that the pointer exclusively references the single data slice stored at the location on the physical storage device.

2. The computer-implemented method of claim 1, wherein the no-seek delete of the first data slice further comprises:
   updating storage accounting to indicate that storage occupied on the physical storage device containing the first data slice is free; and
   deleting the record for the first data slice from the catalog of the storage system.

3. The computer-implemented method of claim 1, wherein obtaining the pointer further comprises:
   obtaining the pointer from the record for the first data slice included in the catalog of the storage system.

4. The computer-implemented method of claim 1, wherein determining that the pointer exclusively references the first data slice further comprises:

querying a tracking data structure that is maintained to track whether the pointer references more than one data slice.

5. The computer-implemented method of claim 1, wherein the request to delete the first data slice further comprises a request to delete an object associated with a plurality of data slices, wherein deleting the object comprises:
- determining that a second pointer for a second data slice included in the plurality of data slices references more than one storage location;
- accessing one or more storage locations referenced by the second pointer to confirm that the second data slice exists at the storage locations; and
- deleting the second data slice.

6. The computer-implemented method of claim 1, wherein the request to delete the first data slice further comprises a request to delete a vault containing a collection of objects, wherein deleting the vault comprises:
- performing no-seek deletes of eligible data slices associated with the collection of objects;
- deleting remaining data slices that are not eligible for the no-seek deletes after accessing respective storage locations to confirm that the remaining data slices exist at the storage locations; and
- deleting the vault.

7. The computer-implemented method of claim 1, wherein the request to delete the first data slice further comprises a request to move the first data slice from a first storage location to a second storage location, wherein migrating the first data slice comprises:
- copying the first data slice to the second storage location; and
- performing the no-seek delete of the first data slice stored at the first storage location.

8. A system comprising:
- one or more computer readable storage media storing program instructions and one or more processors which, in response to executing the program instructions, are configured to:
- determine, in response to a request to delete a first data slice managed by a storage system, that a record for the first data slice exists in a catalog of the storage system;
- obtain a pointer for the first data slice, the pointer referencing a location on a physical storage device as containing the first data slice;
- determine that the pointer exclusively references a single data slice stored at the location on the physical storage device; and
- perform a no-seek delete of the first data slice in response to the determining that the record for the first data slice exists in the catalog of the storage system and the determining that the pointer exclusively references the single data slice stored at the location on the physical storage device.

9. The system of claim 8, wherein the program instructions configured to cause the one or more processors to perform the no-seek delete of the first data slice are further configured to cause the one or more processors to:
- update storage accounting to indicate that storage occupied on the physical storage device containing the first data slice is free; and
- delete the record for the first data slice from the catalog of the storage system.

10. The system of claim 8, wherein the program instructions configured to cause the one or more processors to obtain the pointer are further configured to cause the one or more processors to:
- obtain the pointer from the record for the first data slice included in the catalog of the storage system.

11. The system of claim 8, wherein the program instructions configured to cause the one or more processors to determine that the pointer references the first data slice are further configured to cause the one or more processors to:
- query a tracking data structure that is maintained to track whether the pointer references more than one data slice.

12. The system of claim 8, wherein the request to delete the first data slice further comprises a request to delete an object associated with a plurality of data slices, the program instructions being further configured to cause the one or more processors to:
- determine that a second pointer for a second data slice included in the plurality of data slices references more than one storage location;
- access one or more storage locations referenced by the second pointer to confirm that the second data slice exists at the storage locations; and
- delete the second data slice.

13. The system of claim 8, wherein the request to delete the first data slice further comprises a request to delete a vault containing a collection of objects, the program instructions being further configured to cause the one or more processors to:
- perform no-seek deletes of eligible data slices associated with the collection of objects;
- delete remaining data slices that are not eligible for the no-seek deletes after accessing respective storage locations to confirm that the remaining data slices exist at the storage locations; and
- delete the vault.

14. The system of claim 8, wherein the request to delete the first data slice further comprises a request to move the first data slice from a first storage location to a second storage location, the program instructions being further configured to cause the one or more processors to:
- copy the first data slice to the second storage location; and
- perform the no-seek delete of the first data slice stored at the first storage location.

15. A computer program product comprising:
- one or more computer readable storage media, and program instructions collectively stored on the one or more computer readable storage media, the program instructions configured to cause one or more processors to:
- determine, in response to a request to delete a first data slice managed by a storage system, that a record for the first data slice exists in a catalog of the storage system;
- obtain a pointer for the first data slice, the pointer referencing a location on a physical storage device as containing the first data slice;
- determine that the pointer exclusively references a single data slice stored at the location on the physical storage device; and
- perform a no-seek delete of the first data slice in response to the determining that the record for the first data slice exists in the catalog of the storage system and the determining that the pointer exclusively references the single data slice stored at the location on the physical storage device.

16. The computer program product of claim 15, wherein the program instructions configured to cause the one or more processors to perform the no-seek delete of the first data slice are further configured to cause the one or more processors to:

update storage accounting to indicate that storage occupied on the physical storage device containing the first data slice is free; and delete the record for the first data slice from the catalog of the storage system.

17. The computer program product of claim 15, wherein the program instructions configured to cause the one or more processors to obtain the pointer are further configured to cause the one or more processors to:

obtain the pointer from the record for the first data slice included in the catalog of the storage system; and query a tracking data structure that is maintained to track whether the pointer references more than one storage location on the physical storage device.

18. The computer program product of claim 15, wherein the request to delete the first data slice further comprises a request to delete an object associated with a plurality of data slices, the program instructions being further configured to cause the one or more processors to:

Determine that a second pointer for a second data slice included in the plurality of data slices references more than one storage location;

access one or more storage locations referenced by the second pointer to confirm that the second data slice exists at the storage locations; and delete the second data slice.

19. The computer program product of claim 15, wherein the request to delete the first data slice further comprises a request to delete a vault containing a collection of objects, the program instructions being further configured to cause the one or more processors to:

perform no-seek deletes of eligible data slices associated with the collection of objects;

delete remaining data slices that are not eligible for the no-seek deletes after accessing respective storage locations to confirm that the remaining data slices exist at the storage locations; and delete the vault.

20. The computer program product of claim 15, wherein the request to delete the first data slice further comprises a request to move the first data slice from a first storage location to a second storage location, the program instructions being further configured to cause the one or more processors to:

copy the first data slice to the second storage location; and perform the no-seek delete of the first data slice stored at the first storage location.

\* \* \* \* \*